United States Patent
Tanimura

(10) Patent No.: US 6,741,601 B1
(45) Date of Patent: May 25, 2004

(54) DELAY FLUCTUATION ABSORBING DEVICE AND METHOD

(75) Inventor: Takuji Tanimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/535,009

(22) Filed: Mar. 23, 2000

(30) Foreign Application Priority Data

Mar. 31, 1999 (JP) .......................................... 11-090399

(51) Int. Cl.⁷ .............................................. H04L 12/28
(52) U.S. Cl. ...................................................... 370/412
(58) Field of Search ................................. 370/412, 465, 370/474, 505, 506, 517, 519, 545, 253, 395.21, 395.62, 395.1; 709/233, 234

(56) References Cited

U.S. PATENT DOCUMENTS

| | | | |
|---|---|---|---|
| 4,453,247 A | * 6/1984 | Suzuki et al. | 370/252 |
| 5,148,429 A | * 9/1992 | Kudo et al. | 370/473 |
| 5,297,139 A | * 3/1994 | Okura et al. | 370/428 |
| 5,412,642 A | 5/1995 | Nunukawa | |
| 5,777,985 A | * 7/1998 | Nakayama | 370/235 |
| 5,838,689 A | 11/1998 | Fukui | |
| 5,914,954 A | * 6/1999 | Nakayama | 370/394 |
| 6,556,568 B2 | * 4/2003 | Sasaki | 370/395.1 |

FOREIGN PATENT DOCUMENTS

| | | |
|---|---|---|
| JP | 57-159192 | 1/1982 |
| JP | KOKAI 64-029141 | 1/1989 |
| JP | KOKAI 1-248726 | 10/1989 |
| JP | 02-63346 | 2/1990 |
| JP | KOKAI 2-063346 | 3/1990 |
| JP | KOKAI 2-067847 | 3/1990 |
| JP | KOKAI 2-203641 | 8/1990 |
| JP | 02-203641 | 8/1990 |
| JP | 04-331529 | 11/1992 |
| JP | KOKAI 6-046080 | 2/1994 |
| JP | 08-51442 | 2/1996 |
| JP | KOKAI 9-200265 | 7/1997 |
| JP | 09-200265 | 7/1997 |

* cited by examiner

Primary Examiner—Chi Pham
Assistant Examiner—Alexander O. Boakye
(74) Attorney, Agent, or Firm—Whitham, Curtis & Christofferson, P.C.

(57) ABSTRACT

A delay fluctuation absorbing device includes transmission delay fluctuation absorbing buffers and CPUs. Each transmission delay fluctuation absorbing buffer stores packets sent through a network. Each CPU reads out each packet from the buffer a predetermined read delay time after the packet is stored in the buffer, and updates the read delay time of the buffer on the basis of the transmission delay time of the packet at unit time intervals. Each CPU shortens the read delay time step by step when the read delay time is to be shorted by updating. A delay fluctuation absorbing method is also disclosed.

20 Claims, 10 Drawing Sheets

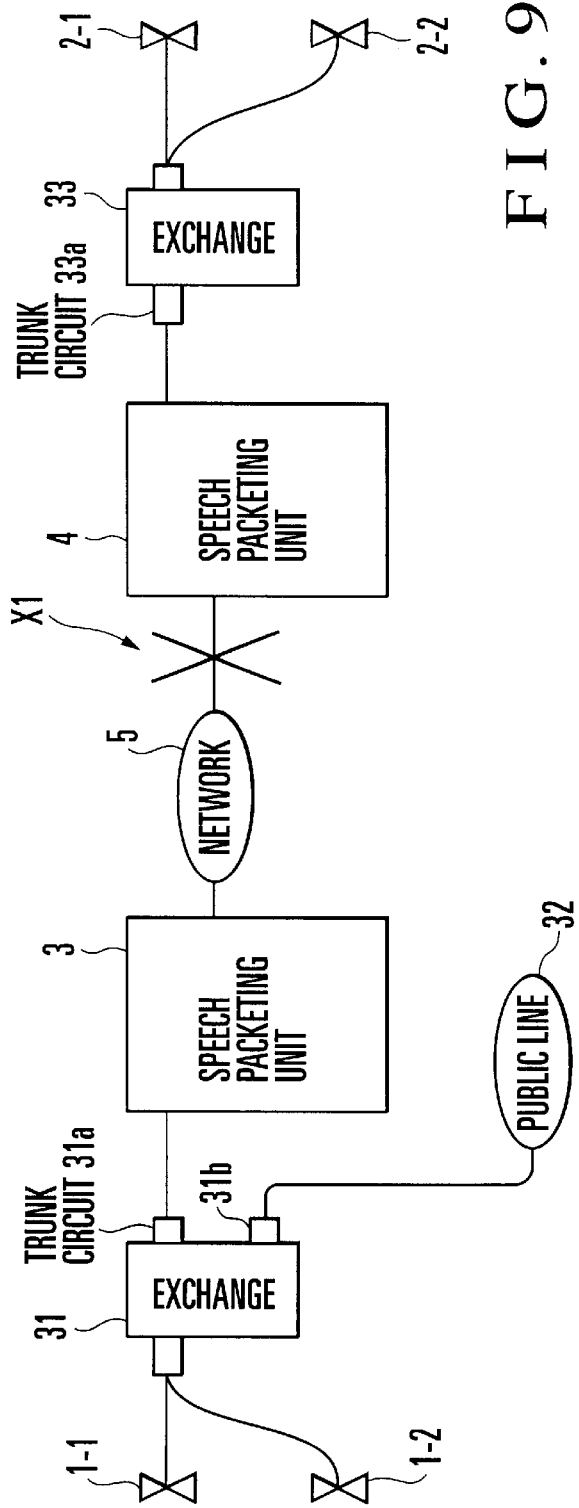
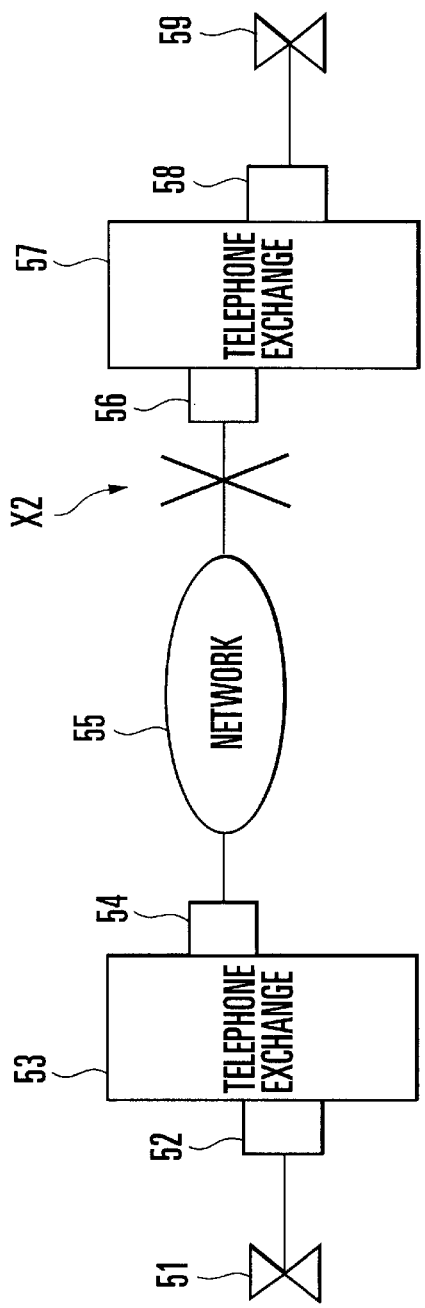
FIG. 9
FIG. 10

DELAY FLUCTUATION ABSORBING DEVICE AND METHOD

BACKGROUND OF THE INVENTION

The present invention relates to a delay fluctuation absorbing device and method and, more particularly, to a delay fluctuation absorbing device and method used on the reception apparatus side when speech communication is performed by using an Ethernet, ATM (Asynchronous Transfer Mode), or the like.

Conventional apparatuses for transmitting/receiving speech information upon packeting it have used a technique of maintaining continuity in speech communication by starting to read a received packet with a long transmission delay after a lapse of an allowable period of time by using a buffer for absorbing transmission delay fluctuations on the receiving side.

The following problems are, however, posed in the conventional technique. According to Japanese Patent Laid-Open No. 64-29141 (reference 1), the read timing of a transmission delay fluctuation absorbing buffer is fixed depending on the device using the buffer. If, therefore, the read timing is set to be early, the information of a speech packet with a long transmission delay cannot be reconstructed. If the read timing is set to be slow, speech information can be continuously reconstructed, but echoes are produced or talkers feel incongruous in two-way speech communication because the fixed delay time is long.

In order to solve such problems, Japanese Patent Laid-Open No. 9-200265 (reference 2) has been proposed. According to this conventional technique, a packet is transmitted after transmission time information is added to the header portion of the packet on the transmitting side. On the receiving side, the transmission delay time obtained from the transmission time information of the header portion of the packet and reception time information in a receiving unit is compared with the read timing of the transmission delay fluctuation absorbing buffer, and the read timing is changed on the basis of the comparison result. According to this scheme, the read timing of the transmission delay fluctuation absorbing buffer can always be adjusted in accordance with the transmission delay fluctuations.

If, however, speech packets with long and short transmission delays are alternately received, the read timing of the transmission delay fluctuation absorbing buffer is frequently updated, and the difference between the timing before updating and the timing after updating is large. For this reason, speech communication is interrupted at the instant when the timing is changed. In addition, the reception delay time alternately prolongs and shortens. This makes talkers greatly feel incongruous.

A technique similar to that in reference 2 is also disclosed in Japanese Patent Laid-Open No. 2-63346 (reference 3). Other examples of this type of delay fluctuation absorbing device are disclosed in Japanese Patent Laid-Open Nos. 1-248726 (reference 4), 2-67847 (reference 5), 2-203641 (reference 6), and 6-46080 (reference 7).

According to reference 3, a transmission delay time is obtained from a generation time added to a header at the time of transmission and a packet reception time. A received packet is then delayed and reconstructed. According to reference 4, a transmission packet is delayed by a time set therein and read on the receiving side. In reference 5, when the number of packets stored in a FIFO (First-In First-Out) buffer becomes a predetermined value or less, reading of packets from the FIFO buffer is stopped. When this number becomes a predetermined value or more, reading of packets from the FIFO buffer is resumed.

According to reference 6, a change in average delay time is monitored. When the change ratio is a predetermined value or less, and fluctuations are not absorbed, the fluctuation absorption delay time is prolonged. When fluctuations are absorbed, the fluctuation absorption delay time is shortened. In reference 7, the basic fluctuation absorption time is corrected on the basis of the number of cells received within a predetermined monitoring time T upon arrival of the first cell, and a decoding time.

In any of references 3 to 7, however, any technique of solving the above problems is not disclosed.

SUMMARY OF THE INVENTION

It is an object of the present invention to provide a delay fluctuation absorbing device and method which can improve speech quality.

It is another object of the present invention to provide a delay fluctuation absorbing device and method which can make a talker feel less incongruous in hearing.

In order to achieve the above objects, according to the present invention, there is provided a delay fluctuation absorbing device comprising buffer means for storing a packet sent through a transmission line, and buffer control means for reading out the packet from the buffer means a predetermined read delay time after the packet is stored in the buffer means, and updating the read delay time of the buffer means on the basis of a transmission delay time of the packet at unit time intervals, wherein the buffer control means shortens the read delay time step by step when the read delay time is to be shortened by updating.

BRIEF DESCRIPTION OF THE DRAWINGS

FIG. 9 is a block diagram showing the operation of the network system in FIG. 2;

FIG. 10 is a block diagram showing the operation of the network system in FIG. 7;

DESCRIPTION OF THE PREFERRED EMBODIMENTS

The present invention will be described in detail below with reference to the accompanying drawings.

Figure 1:
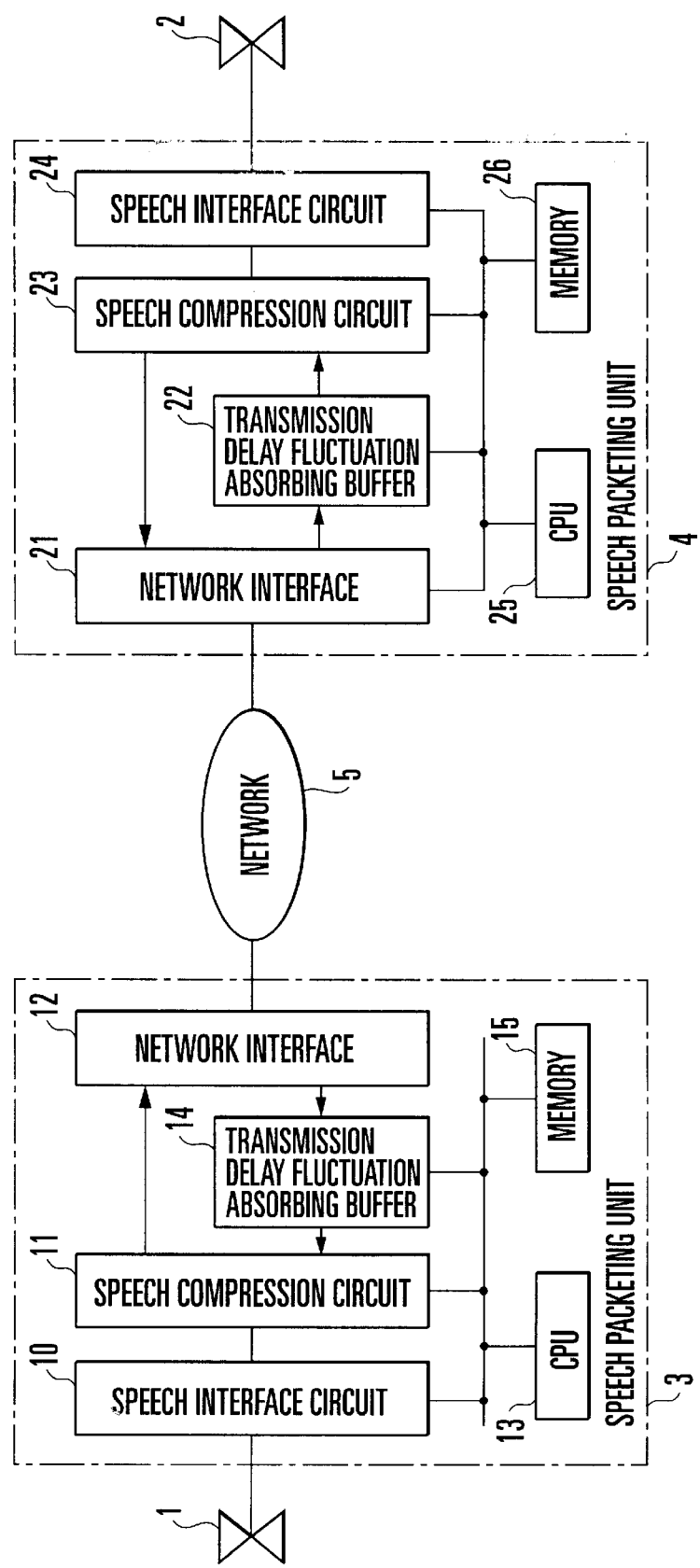
FIG. 1 is a block diagram showing the basic arrangement of a network system including a delay fluctuation absorbing device according to the present invention.

FIG. 1 shows the basic arrangement of a network system including a delay fluctuation absorbing device according to the present invention. As shown in FIG. 1, the network system according to the present invention is comprised of telephones 1 and 2, speech packeting units 3 and 4 to which the telephones 1 and 2 are connected, and a network 5 to which the speech packeting units 3 and 4 are connected.

The speech packeting units 3 and 4 are respectively comprised of speech interface circuits 10 and 24 to which the telephones 1 and 2 are connected, speech compression circuits 11 and 23, network interfaces 12 and 21 connected to the speech interface circuits 10 and 24, CPUs (Central Processing Units) 13 and 25, transmission delay fluctuation absorbing buffers 14 and 22 for temporarily storing outputs from the network interfaces 12 and 21 and outputting them to speech compression circuits 11 and 23, and memories 15 and 26.

The CPUs 13 and 25 control the speech interface circuits 10 and 24, network interfaces 12 and 21, transmission delay fluctuation absorbing buffers 14 and 22, and the like. The network 5 uses packet communication such as Ethernet communication or ATM communication, and has a characteristic feature that packets have different delay times in transmission of packets from the transmitting side to the receiving side.

The speech packeting units 3 and 4 respectively convert analog speech signals from the telephones 1 and 2 into packets, and send them to the network 5. The speech packeting units 3 and 4 also reconstruct speech packets received from the network 5 into analog speech signals. Assume that the telephone 1 and speech packeting unit 3 are on the transmitting side, and the telephone 2 and speech packeting unit 4 are on the receiving side. In this case, an analog speech signal output from the telephone 1 is converted into a speech packet by the speech packeting unit 3. This packet is sent to the speech packeting unit 4 through the network 5. The speech packeting unit 4 reconstructs the received speech packet into analog speech information, and sends it to the telephone 2. This allows speech communication from the telephone 1 to the telephone 2.

The internal arrangement of the speech packeting unit 3 on the transmitting side will be described. The speech interface circuit 10 converts an analog speech signal into a 64-kbps PCM signal or the like. The speech compression circuit 11 converts the 64-kbps PCM signal from the speech interface circuit 10 into speech compressed data that is speech-compressed to 8 kbps. The network interface 12 generates a speech packet by adding a header as address information of the network 5 to the speech compressed data from the speech compression circuit 11, and sends the packet to the network 5. The CPU 13 controls the above transmission operation.

The internal arrangement of the speech packeting unit 4 on the receiving side will be described. The network interface 21 receives a speech packet sent from the network 5, and extracts speech compressed data by removing the header information from the received speech packet. The CPU 25 writes the speech compressed data from the network interface 21 in the transmission delay fluctuation absorbing buffer 22. The CPU 25 also calculates transmission delay times from the reception intervals of speech packets received from the network 5, and stores them in the memory 26. The CPU 25 calculates the buffer amount of the transmission delay fluctuation absorbing buffer 22 which is required to absorb packet transmission delay fluctuations, at predetermined time intervals, on the basis of the stored transmission delay times of the respective speech packets. In accordance with this calculation result, the CPU 25 adjusts the buffer amount, i.e., the read timing, at predetermined time intervals.

Since the packets have different transmission delays in the network 5, when, for example, a packet with a long transmission delay is received after a packet with a short transmission delay, continuous speech data cannot be obtained, with omission of intermediate speech data, by simply joining the received speech packets. In order to prevent this, speech compressed data from the network interface 21 are buffered by the transmission delay fluctuation absorbing buffer 22 first, and then the data are read out in accordance with the delay time of the packet with the long transaction delay. This makes it possible to obtain continuous speech data.

The speech compression circuit 23 reconstructs speech compressed data read out from the transmission delay fluctuation absorbing buffer 22, i.e., reconstructs the speech data compressed to 8 kbps or the like into the original 64-kbps PCM signal. The speech interface circuit 24 converts the 64-kbps PCM signal from the speech compression circuit 23 into an analog speech signal.

The CPU 25 performs the above reception processing. The CPU 25 also calculates transmission delay times from the reception intervals of received speech packets, and stores them as statistical information in the memory 26. The CPU 25 obtains the required buffer amount of the transmission delay fluctuation absorbing buffer 22 from the stored transmission delay time data, and adjusts the read timing of the transmission delay fluctuation absorbing buffer 22, as needed. In this adjustment, the CPU 25 performs control operation to quickly change the read timing when it is to be delayed and to change the read timing in a predetermined period of time when it is to be quickened.

In a network designed to transmit/receive speech information upon packeting it in this manner, speech packets can be reconstructed into continuous speech data when reconstructed into a speech signal by controlling the read timing of the transmission delay fluctuation absorbing buffer, as needed. In addition, since the delay times based on the transmission delay fluctuation absorbing buffer can be set to proper values, speech interruptions can be prevented, and the delay times of speech information can be minimized.

In addition, in controlling the read timing of the transmission delay fluctuation absorbing buffer, the buffer amount is quickly changed when it is increased, and is changed in a predetermined period of time when it is decreased. This makes it possible to improve speech quality and let a talker feel less incongruous in hearing.

Figure 2:
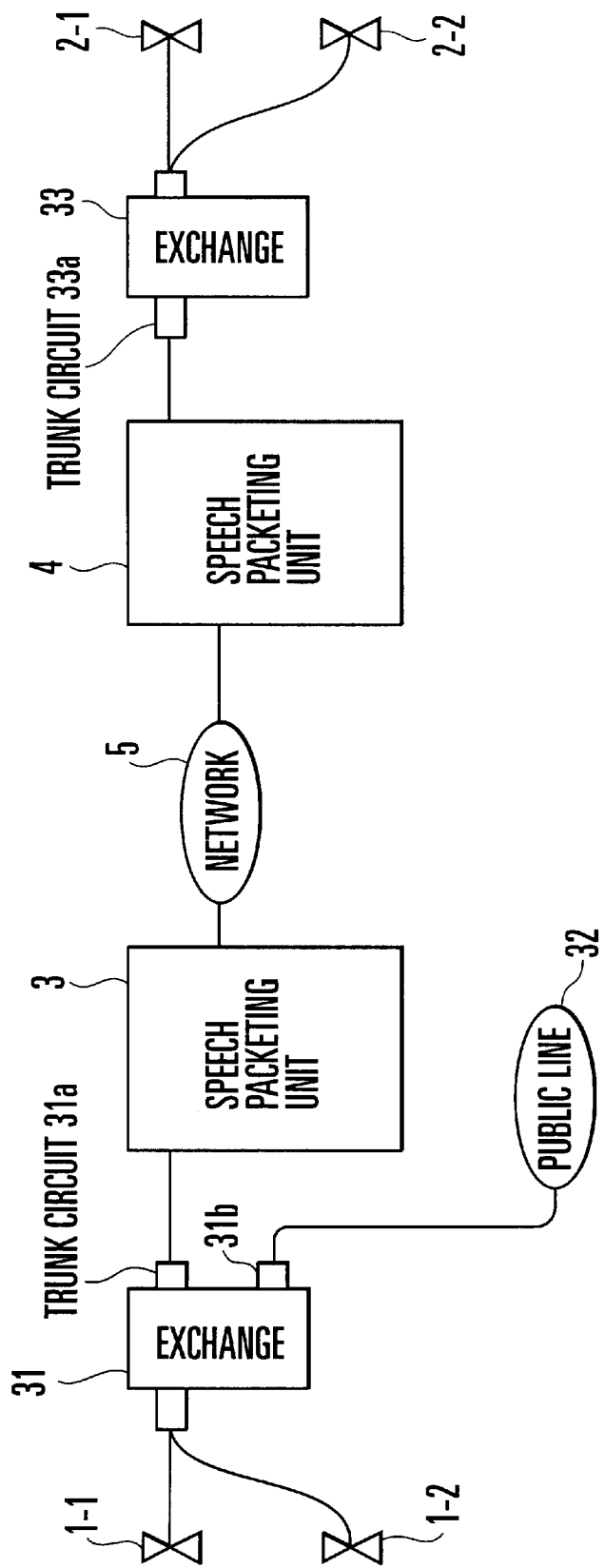
FIG. 2 is a block diagram showing a network system including a delay fluctuation absorbing device according to the first embodiment of the present invention.

FIG. 2 shows the arrangement of a network system including the delay fluctuation absorbing device according to the first embodiment of the present invention. The same reference numerals as in FIG. 1 denote the same parts in FIG. 2, and a description thereof will be omitted.

As shown in FIG. 2, in the network system of this embodiment, the telephone 1 in FIG. 1 is replaced with telephones 1-1 and 1-2, exchange 31, and public line 32, and the telephone 2 is also replaced with telephones 2-1 and 2-2, exchange 33, and the public line 32. Trunk circuits (line interfaces) 31a and 31b connected to the speech packeting unit 3 and public line 32 are connected to the output terminal of the exchange 31. A trunk circuit (line interface) 33a connected to the speech pocketing unit 4 is connected to the input terminal of the exchange 33. Each of the speech packeting units 3 and 4 has the same block arrangement as that shown in FIG. 1.

The present invention can be applied to the above case wherein the telephones 1-1, 1-2, 2-1, and 2-2 are connected to the speech packeting units 3 and 4 through the exchanges 31 and 33.

The operation of the above network system will be described next with reference to FIGS. 3A to 3D and 4 to 7.

FIGS. 3A to 3D explain a method of absorbing the transmission delay fluctuations of speech packets, and show the relationship between the transmission/reception timings of packets and the size of the delay fluctuation absorbing buffer so as to explain the mechanism in which the CPU 25 controls the transmission delay fluctuation absorbing buffer 22.

A transmitting-side packet sending timing 101 (FIG. 3A) is the timing at which the speech packeting unit 3 on the transmitting side sends out a speech packet. A receiving-side packet reception timing 102 (FIG. 3B) is the timing at which the speech packeting unit 4 receives a speech packet and writes it in the transmission delay fluctuation absorbing buffer 22. A delay absorbing buffer output 103 (FIG. 3C) indicates the output timing of the transmission delay fluctuation absorbing buffer 22 when the buffer amount of the transmission delay fluctuation absorbing buffer 22 is small (the read timing is quick). A delay absorbing buffer output 104 (FIG. 3D) indicates the output timing of the transmission delay fluctuation absorbing buffer 22 when the buffer amount of the transmission delay fluctuation absorbing buffer 22 is large (the read timing is slow). Referring to 3A to 3D, reference symbols A to H denote speech packets.

Figure 3:
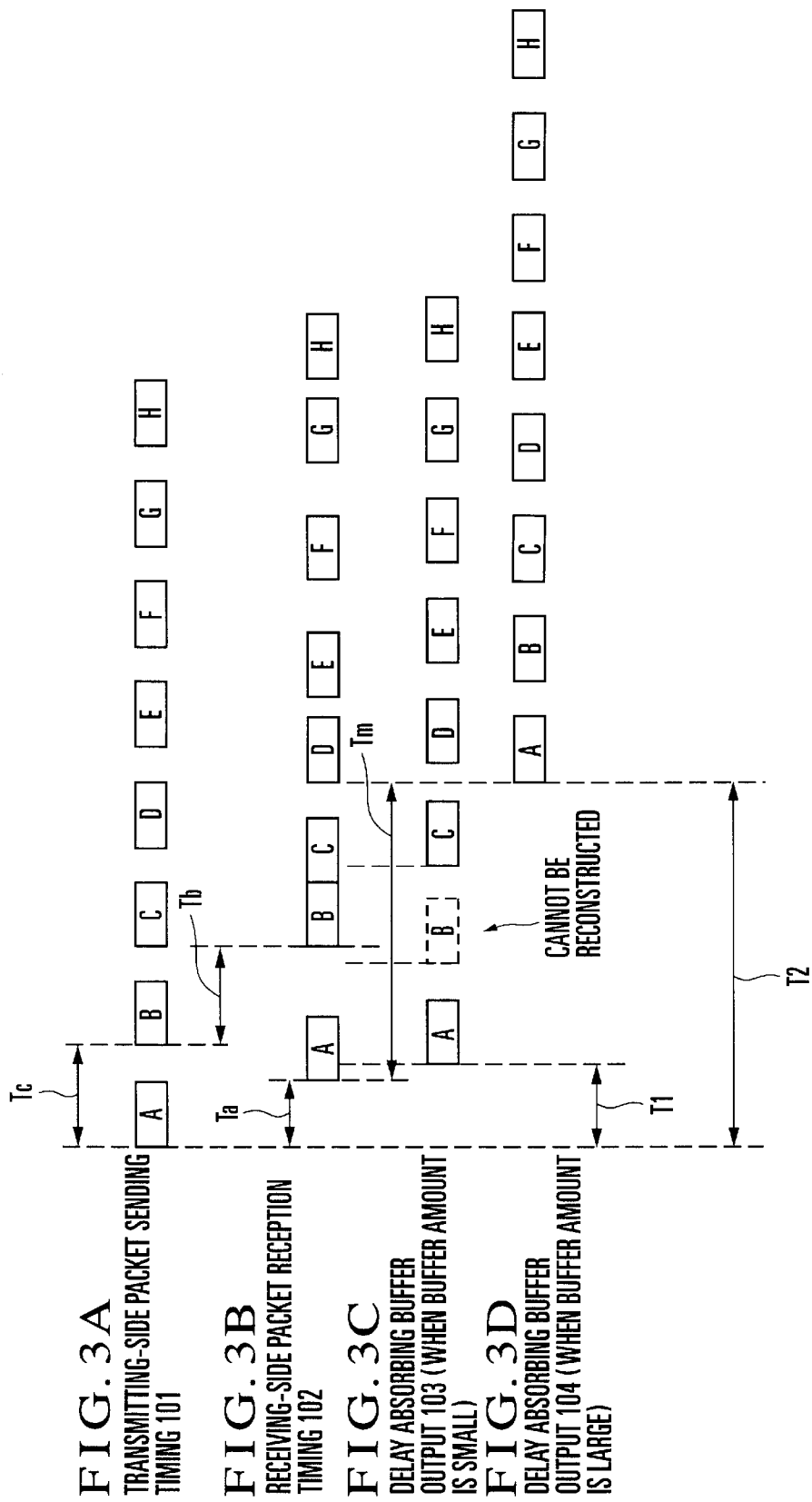
FIGS. 3A to 3D are timing charts showing the operation of a packeting unit in FIG. 2.

The speech packeting unit 3 sends out packets A, B, C, D, E, F, G, and H at packet intervals Tc (sec), as shown in FIG. 3A, in sending out speech information to the network 5. The speech packeting unit 4 receives the packets A to H through the network 5. At this time, the packets A to H undergo transmission delays in the network 5. The delays are not equal and are different in packets. Assume that the transmission delays of the packets A, C, D, F, and H are almost equal, the delay of the packet E is shorter than the average, the delay of the packet G is longer than the average, and the delay of the packet B is longer than that of the packet G.

The speech packeting unit 4 writes the packets A to H, received at the receiving-side packet reception timing 102, in the transmission delay fluctuation absorbing buffer 22 under the control of the CPU 25. The CPU 25 calculates the transmission delays of the respective packets from the reception intervals of the speech packets, and stores the calculation results in the memory 26. The CPU 25 calculates a buffer amount required for the transmission delay fluctuation absorbing buffer 22 from the transmission delay time data stored in the memory 26 at predetermined time intervals, thus determining a read timing. A speech packet is read out from the transmission delay fluctuation absorbing buffer 22 at the determined read timing. The delay absorbing buffer output 103 (FIG. 3C) indicates the read timing when the buffer value of the transmission delay fluctuation absorbing buffer 22 is small. The delay absorbing buffer output 104 (FIG. 3D) indicates the read timing when the buffer value is large.

When the buffer amount of the transmission delay fluctuation absorbing buffer 22 is small, a delay time due to packeting is as small as a packeting delay time T1 (sec). Consider a packet with a long transmission delay like the packet B. At the timing at which the packet B is to be read out from the transmission delay fluctuation absorbing buffer 22, the packet B has not received from the network 5 yet. For this reason, the packet B cannot be reconstructed, and hence is processed as a packet loss, as shown in FIG. 3C.

If the buffer amount of the transmission delay fluctuation absorbing buffer 22 increases, even the packet B with a long transmission delay can be handled, and no packet loss due to a long transmission delay occurs. However, a packeting delay time T2 (sec) is much longer than the time T1, as shown in FIG. 3D.

The sense of hearing of a talker is greatly influenced by a packeting delay time. As the packeting delay time prolongs, echoes are produced or slight lags are produced between utterances from two talkers, resulting in an increase in the sense of incongruity. In contrast to this, when the packeting delay time is short, echoes and lags between utterances are little or not produced. However, since the transmission delay fluctuation absorbing buffer 22 cannot make fluctuation adjustment to packets with long transmission delays, packets with long transmission delays are processed as a packet loss. If a packet loss occurs, the data portion of the corresponding packet is lost, resulting in a deterioration in speech quality.

For this reason, when a transmission delay is short, the buffer amount of the transmission delay fluctuation absorbing buffer 22 is preferably small, and vice versa. The transmission delays in the network 5 depend on routes in the network through which packets are transmitted, or increase or decrease, i.e., sequentially change, depending on the load imposed on the network. For this reason, the speech packeting unit 4 calculates transmission delays from the reception intervals of received speech packets, and sequentially adjusts the buffer amount of the transmission delay fluctuation absorbing buffer 22, thus improving speech quality.

In general, if a packet loss occurs, two talkers cannot satisfactorily converse with each other because speech communication is interrupted. On the other hand, if a packeting delay time is long, two talkers can converse with each other although they feel incongruous. In consideration of these points, the buffer amount is adjusted to minimize packet loss and minimize packeting delay time.

The operation of the CPU 25 that controls the transmission delay fluctuation absorbing buffer 22 in the speech packeting unit 4 will be described next with reference to FIGS. 4 and 5A to 5H.

Figure 4:
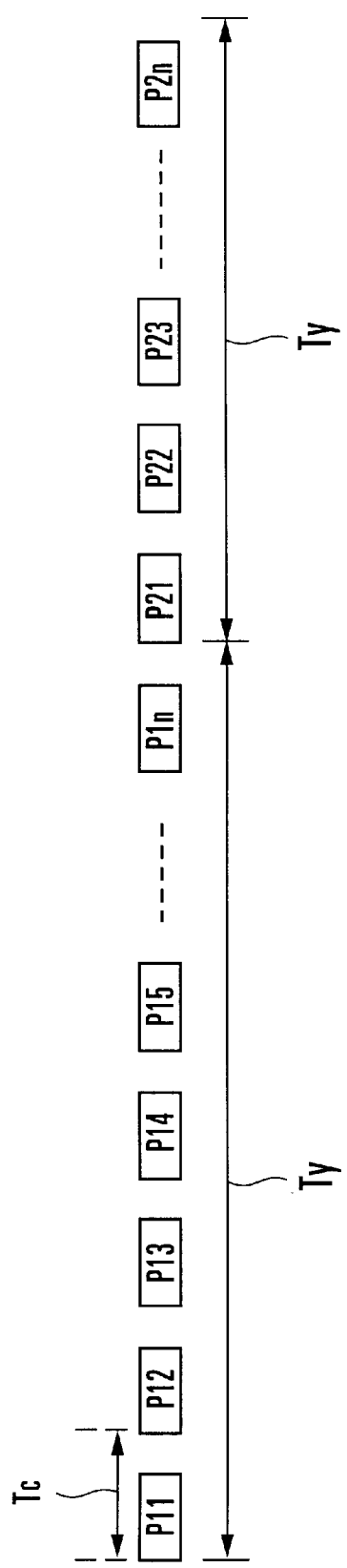
FIG. 4 is a timing chart showing the operation of the packeting unit in FIG. 2.
Figure 5:
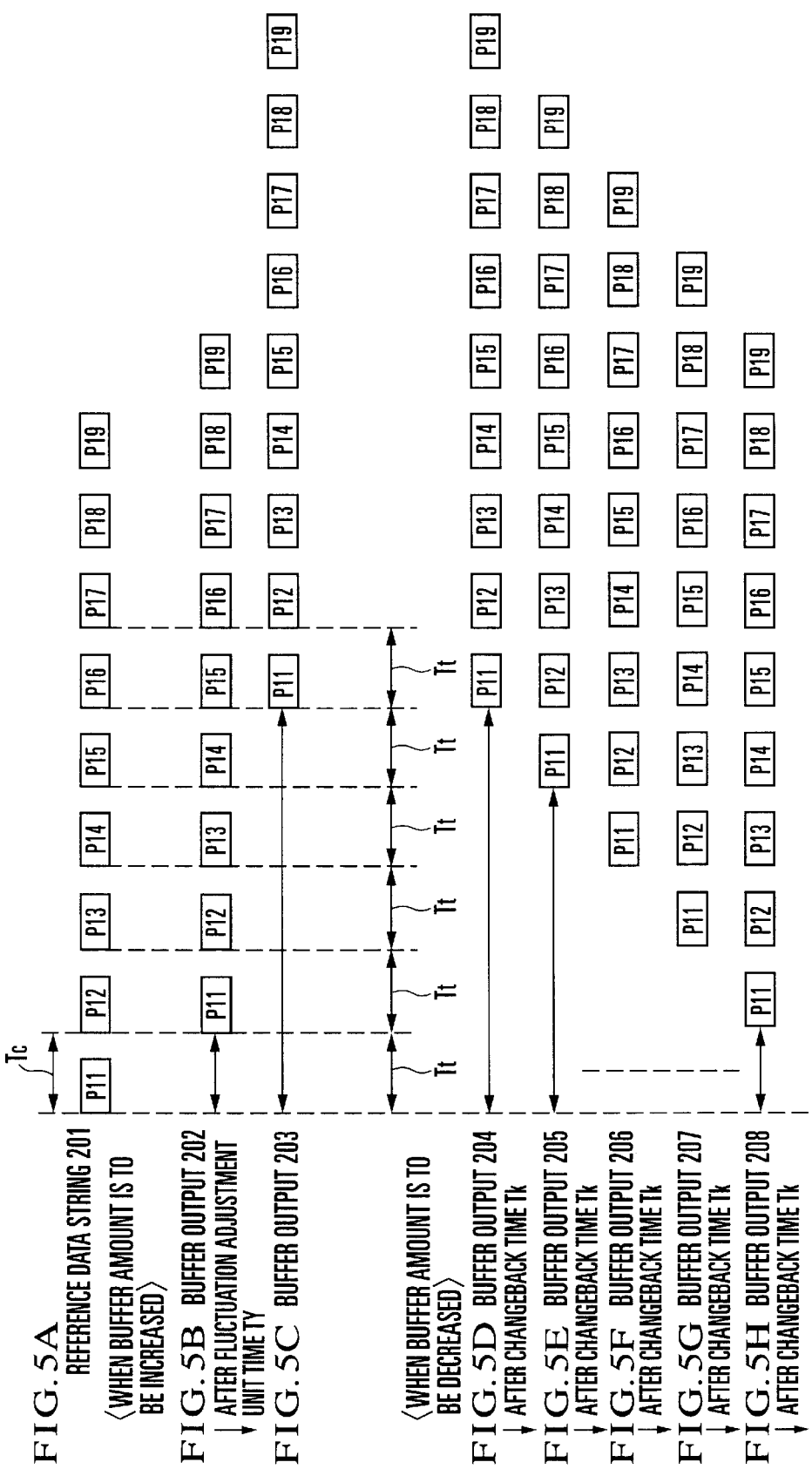
FIGS. 5A to 5H are timing charts showing the operation of the packeting unit in FIG. 2.

Referring to FIG. 4, the intervals between speech packets P11 to P1n and P21 to P2n (n is a positive integer) are represented by Tc (sec), and a fluctuation adjustment unit time is represented by Ty (sec). That is, a buffer amount is determined by checking the number of packets that can be received within the unit time Ty.

A reference data string 201 (FIG. 5A) indicates an ideal state wherein there is no fluctuation in the transmission delays of the received speech packets P11 to P19. In practice, however, since the speech packets P11 to P19 are received with transmission delay fluctuations, the fluctuations are adjusted by buffering by means of the transmission delay fluctuation absorbing buffer 22. If the unit time (delay unit time) for fluctuation adjustment is a buffer adjustment unit time Tt (sec), buffering can be set in units of (Tt× positive number).

Referring to FIGS. 5A to 5H, buffer adjustment unit time Tt=speech packet interval Tc. However, the present invention is not limited to this, and the buffer adjustment unit time Tt may be set to an arbitrary time.

Consider the buffer output timing when the buffer amount changes from a small value to a large value. In this case, a buffer output 202 (FIG. 5B) indicates a buffer output before the change, and a buffer output 203 (FIG. 5C) indicates a buffer output after the buffer amount is adjusted to a large value. Likewise, consider the buffer output timing when the buffer amount changes from a large value to a small value. In this case, a buffer output 204 (FIG. 5D) indicates a buffer output before the change, and a buffer output 205 (FIG. 5E), buffer output 206 (FIG. 5F), buffer output 207 (FIG. 5G), and buffer output 208 (FIG. 5H) indicate how the buffer amount decreases at intervals of changeback times Tk (sec) as it is adjusted to a small value.

Figure 6:
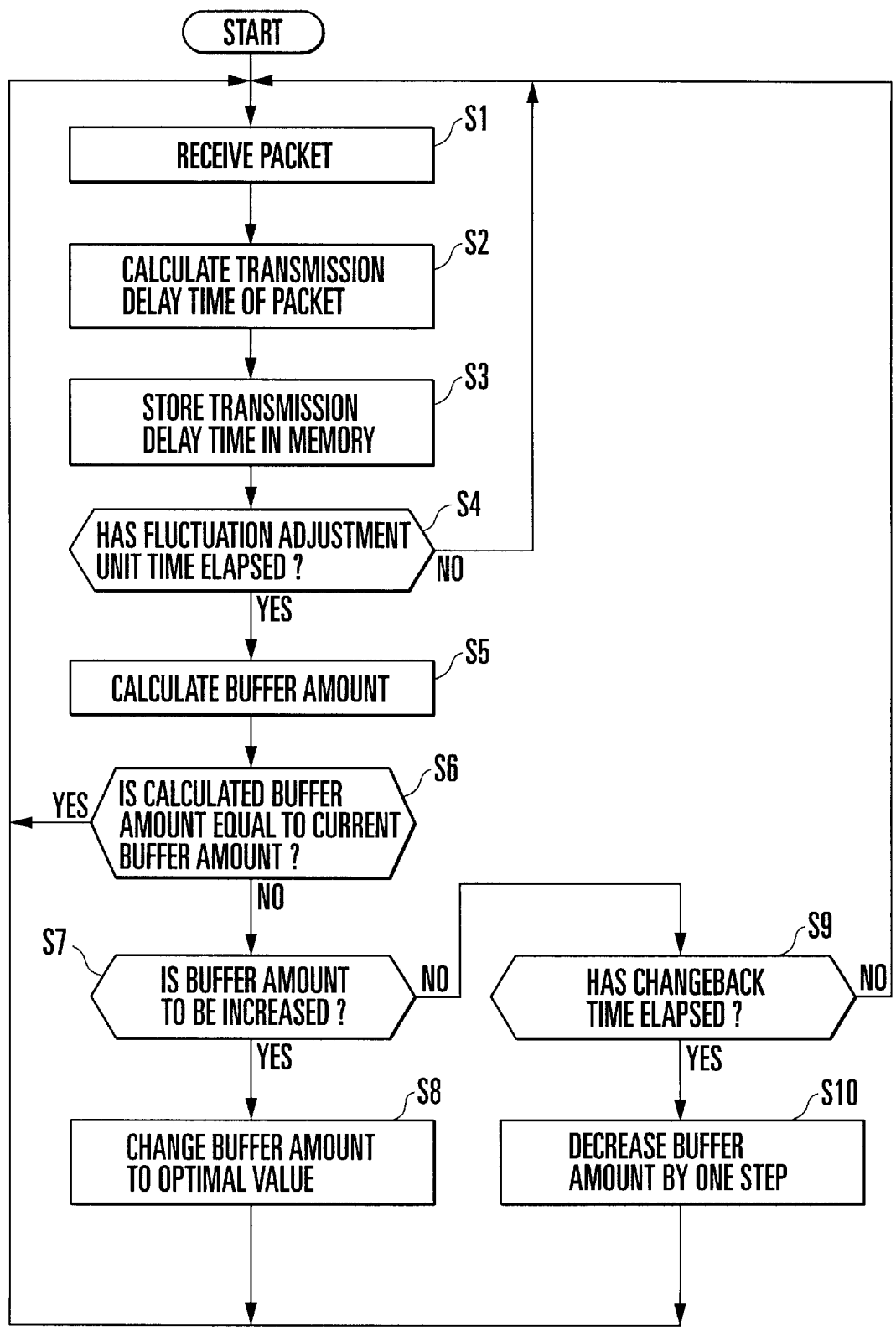
FIG. 6 is a flow chart showing the operation of the packeting unit in FIG. 2.

The operation of the above network system will be described next with reference to the flow chart of FIG. 6.

The CPU 25 receives packets sequentially from the first packet to determine the buffer amount of the transmission delay fluctuation absorbing buffer 22 (step S1). The CPU 25 calculates the transmission delay time of each received packet (step S2), and stores it in the memory 26 (step S3). The CPU 25 then checks whether the fluctuation adjustment unit time Ty has elapsed (step S4), and repeats steps S1 to S3 until the fluctuation adjustment unit time Ty elapses. The CPU 25 then calculates a buffer amount required to absorb transmission delay fluctuations of the n packets P11 to P1n received within the fluctuation adjustment unit time Ty (step S5).

In this calculation, a packet loss may be permitted in the n received packets within the range in which speech quality is not affected much when a speech signal is reconstructed. If, for example, a packet loss of 3% is to be permitted, a buffer amount that can absorb fluctuation of n×0.97 packets may be obtained. This value (3% in this case) may be arbitrarily determined.

The CPU 25 compares the obtained buffer amount with the current buffer amount (step S6). If they are not equal, the CPU 25 determines to increase or decrease the buffer amount (step S7). When the buffer amount is to be increased, i.e., the transmission delay is longer than before, the CPU 25 determines that a speech omission has occurred in the reconstructed speech signal, and the speech quality is greatly affected, and changes the buffer amount from the position of the first packet in the next fluctuation adjustment unit time Ty (step S8). For example, the CPU 25 changes the current buffer output 202 (FIG. 5B) to the buffer output 203 (FIG. 5C) corresponding to the buffer amount calculated after the fluctuation adjustment unit time Ty.

If the CPU 25 determines in step S to decrease the buffer amount, the CPU 25 checks whether a changeback time Tk has elapsed (step S9). After the changeback time Tk elapses, the CPU 25 changes the buffer amount by one step, i.e., by buffer adjustment unit time Tt×1 (step S10). Note that the flow returns to step S1 to repeat the above processing in steps S1 to S6 until it is determined in step S9 that the changeback time Tk has elapsed.

The changeback time Tk is generally set to be longer than the fluctuation adjustment unit time Ty. In steps S9 and S10, the new buffer amount calculated in each fluctuation adjustment unit time Ty is decreased by one step only when the new buffer amount is kept smaller than the current buffer amount within the changeback time Tk.

When the buffer amount is decreased, excess packets are generated at the buffer amount switching timing, but they are discarded without being reconstructed. When the buffer amount is to be decreased after the changeback time Tk, the buffer amount is decreased by an amount corresponding to the buffer adjustment unit time Tt in each changeback operation, but is not changed back to the small value at once unlike the case wherein the buffer amount is changed from the small value to the large value. If, however, the calculated decrease in the buffer amount falls within the range of the buffer adjustment unit time Tt, buffer amount changing operation is completed by one changeback operation.

When, for example, the buffer amount is to be changed from the current buffer output 204 (FIG. 5D) to the newly calculated buffer output 208 (FIG. 5H) (the changed state is to be maintained), the buffer amount is decreased from the buffer output 204 by an amount corresponding to the buffer adjustment unit time Tt at intervals of the changeback time Tk. As a consequence, the buffer amount is decreased step by step in a period of Tk×4 time from the buffer output 205 (FIG. 5E) to the buffer output 208 through the buffer output 206 (FIG. 5F) and buffer output 207 (FIG. 5G).

If it is determined in step S7 that the buffer amount is to be increased, no packet may be read out in units of buffer adjustment unit times Tk. In this case, the CPU 25 inputs pause data by an amount corresponding to the silent time, or inserts the immediately preceding data again.

If it is determined in step S6 that the calculated buffer amount is equal to the current buffer amount, since there is no need to change the buffer amount, the flow returns to step S1 to repeat the above processing in step S2 and the subsequent steps.

Figure 12:
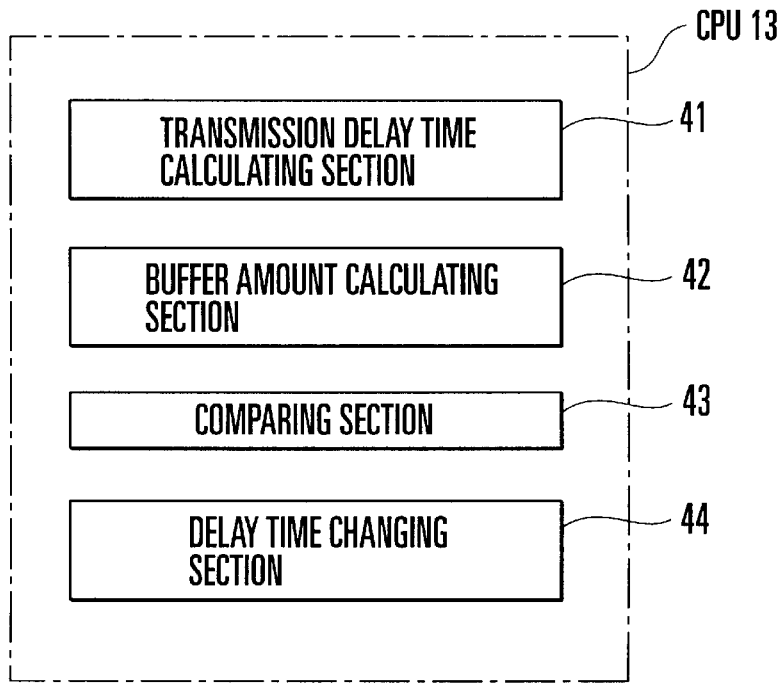
FIG. 12 is a block diagram showing the functions of a CPU in FIG. 1.

FIG. 12 shows the functions of the CPU 25. Referring to FIG. 12, the CPU 25 comprises a transmission delay time calculating section 41 for performing the processing in step S2, a buffer amount calculating section 42 for performing the processing in step S5, a comparing section 43 for performing the processing in step S6, and a delay time changing section 44 for performing the processing in steps S8 to S10.

Figure 7:
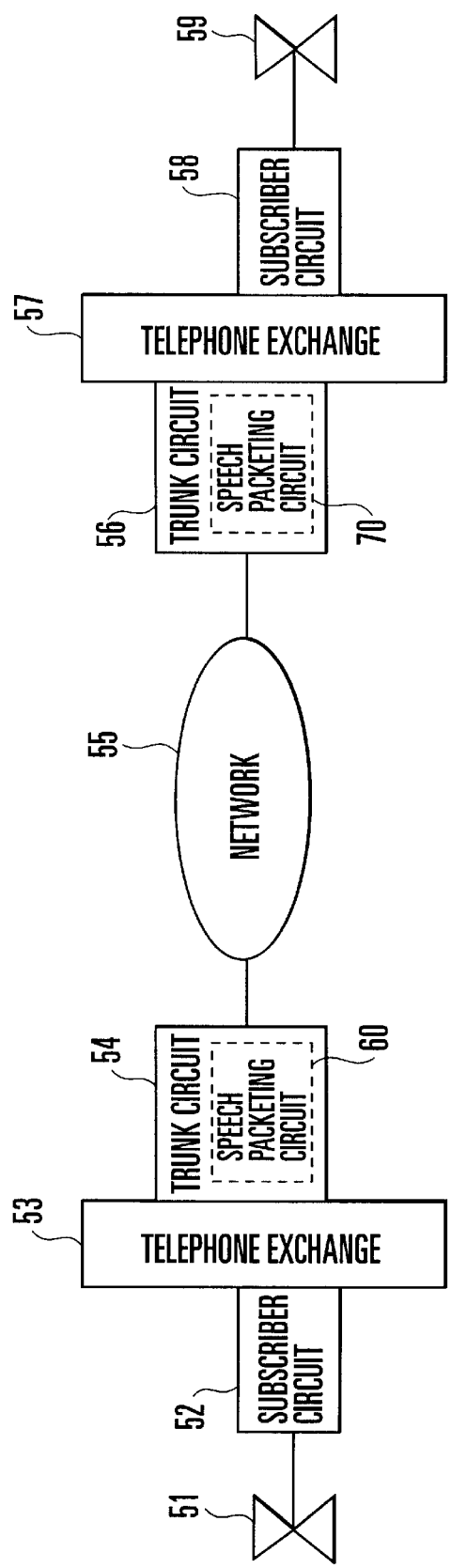
FIG. 7 is a block diagram showing a network system including a delay fluctuation absorbing device according to the second embodiment of the present invention.

FIG. 7 shows the arrangement of a network system including a delay fluctuation absorbing device according to the second embodiment of the present invention. In this embodiment, a speech packeting unit is incorporated in a telephone exchange.

As shown in FIG. 7, the network system of this embodiment is comprised of telephones 51 and 59, subscriber circuits 52 and 58 connected to the telephones 51 and 59, telephone exchanges 53 and 57, trunk circuits 54 and 56 respectively having speech packeting circuits 60 and 70, and a network 55 to which the trunk circuits 54 and 56 are connected. The telephone exchanges 53 and 57 respectively include the subscriber circuits 52 and 58 and the trunk circuits 54 and 56. The network 55 uses packet communication such as Ethernet communication or ATM communication, and has a characteristic feature that packets have different delay times in transmission of packets from the transmitting side to the receiving side.

The speech packeting circuit 60 and 70 incorporated in the trunk circuits 54 and 56 have functions equivalent to those of the speech packeting units 3 and 4 in FIG. 1. The subscriber circuits 52 and 56 have interface functions between the telephones 51 and 59 and the telephone exchanges 53 and 57.

Figure 8:
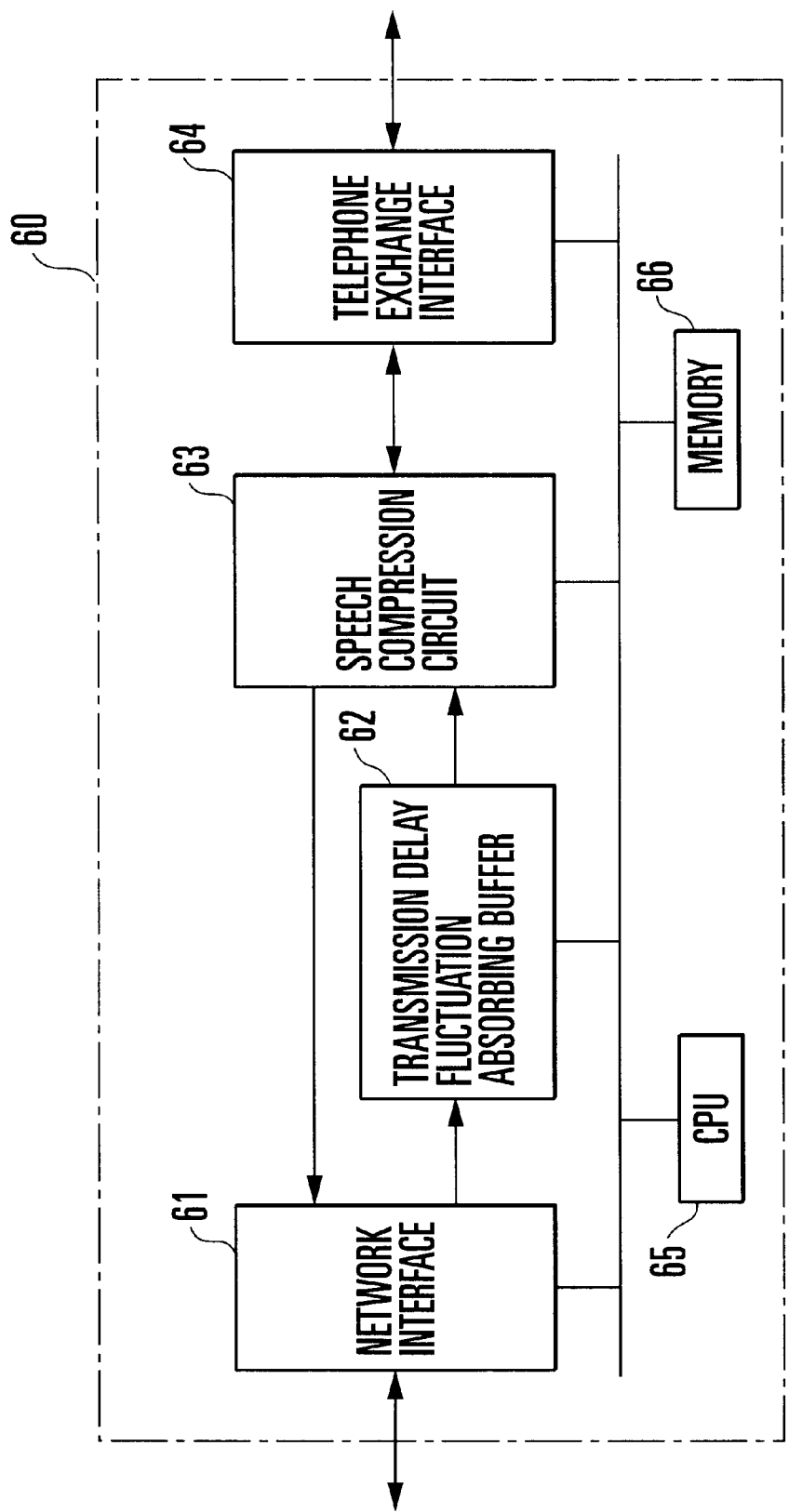
FIG. 8 is a block diagram showing a speech packeting circuit in FIG. 7.

FIG. 8 shows the detailed arrangement of the speech packeting circuit 60, which has the same arrangement as that of the speech packeting circuit 70.

Referring to FIG. 8, the speech packeting circuit 60 is comprised of a network interface 61, transmission delay fluctuation absorbing buffer 62, speech compression circuit 63, telephone exchange interface 64, CPU 65, and memory 66. The telephone exchange interface 64 is an interface circuit between the telephone exchanges 53 and 57, and has the interface function of transmitting/receiving 64-kbps PCM signals and control information to/from the telephone exchanges 53 and 57. The functions of the remaining elements are the same as those of the corresponding elements in FIG. 1.

The first and second embodiments differ in the following point. In the first embodiment, the speech packeting units 3 and 4 are formed as discrete units. In the second embodiment, the speech packeting circuits 60 and 70 function as the trunk circuits (line interfaces) 54 and 56 of the telephone exchanges 53 and 57. However, there is no difference between these embodiments in the transmission delay fluctuation absorbing scheme according to the present invention.

The operation of the above network system will be described next with reference to FIGS. 9 and 10. FIG. 9 corresponds to the first embodiment in FIG. 2. FIG. 10 corresponds to the second embodiment in FIG. 8.

In the first embodiment, as shown in FIG. 9, if a trouble X1 occurs in the line between the network 5 and the speech packeting unit 4, since the speech packeting unit 4 is inserted between the trunk circuit 31a and the trouble point X1, the trunk circuit 31a cannot detect the trouble X1.

In the second embodiment, as shown in FIG. 10, of trouble X2 occurs in the line between the network 55 and the trunk circuit 56, since any device such as a speech packeting unit is not inserted between the trunk circuit 54 and the trouble point X2, the trunk circuit 54 can detect the trouble X2.

Figure 11:
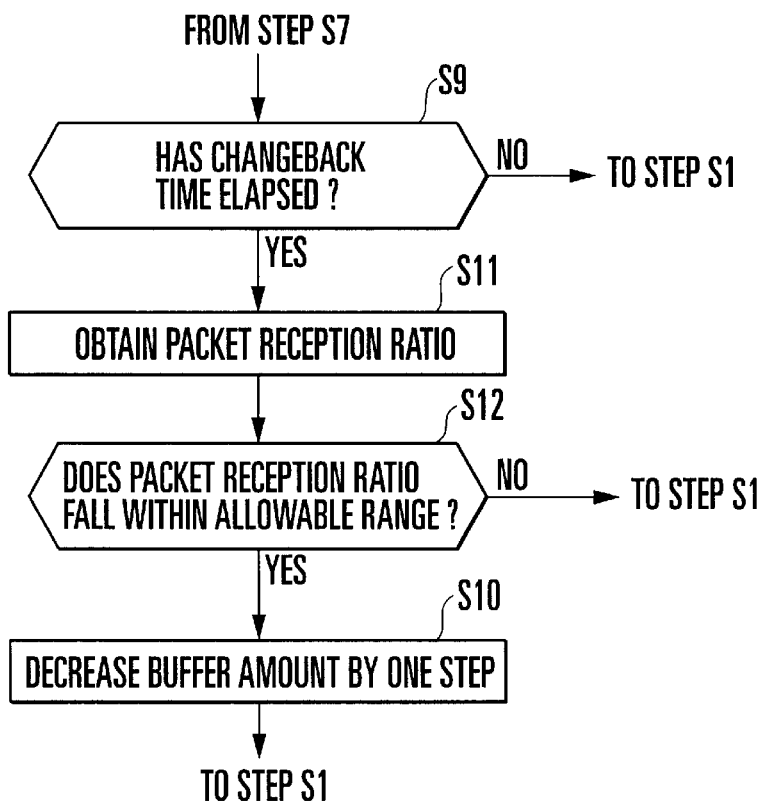
FIG. 11 is a flow chart showing the operation of the third embodiment of the present invention.

The third embodiment will be described next with reference to the flow chart of FIG. 11. Referring to FIG. 11, steps S11 and S12 are added between steps S9 and S10 in FIG. 6. Since the steps other than steps S11 and S12 are the same as those in FIG. 6, a description thereof will be omitted.

When the buffer amount of a transmission delay fluctuation absorbing buffer 22 is to be changed from a large value to a small value, in the first embodiment, the newly obtained buffer amount is compared with the current buffer amount. If it is determined upon comparison that the buffer amount is to be decreased, the buffer amount is decreased after the lapse of the changeback time Tk generally set to be longer than the fluctuation adjustment unit time Ty. The buffer amount is decreased by one step only when the new buffer amount calculated every fluctuation adjustment unit time Ty is kept smaller than the current buffer amount within the changeback time Tk.

In the third embodiment, with regard to the current buffer amount, if it is determined in step S9 that a changeback time Tk has elapsed, a packet reception ratio in a case wherein buffering is performed at a timing earlier than a buffer adjustment unit time Tt is obtained (step S11). It is then checked whether the obtained packet reception ratio falls within an allowable range (step S12). If it is determined that the packet reception ratio falls within the allowable range, the read timing of the transmission delay fluctuation absorbing buffer 22 is quickened by buffer adjustment unit time Ttx1 (step S10).

Although the processing in steps S11 and S12 is performed when it is determined in step S9 that the changeback time Tk has elapsed, this processing may be performed during the changeback time Tk. If it is determined in step S9 that the changeback time has not elapsed, or if it is determined in step S12 that the packet reception ratio does not fall within the allowable range, the flow returns to step S1.

In each of the first to third embodiments, the transmission delay times of packets are obtained by the unit on the receiving side on the basis of the reception intervals of the received packets. However, time information may be added to speech compression information when it is packeted on the transmitting side so as to allow a unit on the receiving side to obtain a transmission delay time from the time information in each packet.

As has been described above, according to the present invention, a delay time in reading packets from a buffer means is updated at predetermined time intervals. In addition, when the delay time is to be shortened, the delay time is shortened step by step. This makes it possible to improve speech quality and let a talker feel less incongruous in hearing.

Assume that the buffer amount of the transmission delay fluctuation absorbing buffer 22 is to be changed. In this case, when the buffer amount is to be increased, the buffer amount is quickly changed to minimize the occurrence of speech interruptions. In contrast to this, when the buffer amount is to be decreased, the buffer amount is decreased in units of buffer adjustment unit times Tt while the network remains stable for a predetermined period of time. In this manner, the buffer amount is decreased step by step to avoid an abrupt change in speech delay time. In addition, speech packets are discarded little by little when the buffer amount is decreased. This makes it possible to minimize a sense of incongruity felt by two talkers in speech communication.

When delays in the network repeatedly increase and decrease, taking a time for a change from a long speech delay to a short speech delay will prevent talkers from feeling a sense of incongruity.

What is claimed is:

1. A delay fluctuation absorbing device comprising:

buffer means for storing a packet sent through a transmission line; and buffer control means for reading out the packet from said buffer means a predetermined read delay time after the packet is stored in said buffer means, and updating the read delay time of said buffer means on the basis of a transmission delay time of the packet at unit time intervals, wherein said buffer control means shortens the read delay time step by step when the read delay time is to be shortened by updating.

2. A device according to claim 1, wherein said buffer control means shortens the read delay time when the transmission delay time obtained at unit time intervals is kept shorter than the read delay time for a first time longer than the unit time.

3. A device according to claim 2, wherein the first time is at least twice the unit time.

4. A device according to claim 1, wherein said buffer control means shortens the read delay time when the transmission delay time obtained at unit time intervals is kept shorter than the read delay time for a first time longer than the unit time and a packet reception ratio in a second time shorter than the read delay time falls within an allowable range.

5. A device according to claim 4, wherein the first time is at least twice the unit time.

6. A device according to claim 1, wherein said buffer control means shortens the read delay time step by step at predetermined time intervals.

7. A device according to claim 1, wherein said buffer control means calculates a read delay time on the basis of a transmission delay time obtained from reception intervals of packets received within the unit time.

8. A device according to claim 1, wherein said buffer control means quickly prolongs the read delay time when the read delay time is to be prolonged by updating.

9. A device according to claim 1, wherein said buffer control means comprises:

transmission delay time calculating means for calculating a transmission delay time of each packet from reception intervals of the packets at unit time intervals;

buffer amount calculating means for calculating a buffer amount of said buffer means which is required to absorb transmission delay fluctuations in packets within the unit time on the basis of a calculation result obtained by said transmission delay time calculating means;

comparing means for comparing the calculated buffer amount from said buffer amount calculating means with a current buffer amount of said buffer means; and delay time adjusting means for shortening the read delay time step by step to an optimal value corresponding to the calculated buffer amount at unit time intervals when it is determined on the basis of the comparison result obtained by said comparing means that the calculated buffer amount is kept smaller than the current buffer amount for a first time longer than the unit time.

10. A device according to claim 9, wherein said delay time adjusting means quickly prolongs the read delay time to an optimal value corresponding to the calculated buffer amount when the calculated buffer amount is larger than the current buffer amount.

11. A device according to claim 1, wherein said buffer means and said buffer control means are connected between the transmission line and a terminal apparatus for transmitting/receiving a packet.

12. A device according to claim 1, wherein said buffer means and said buffer control means are connected between the transmission line and one terminal of a trunk circuit, and a terminal apparatus is connected to the other terminal of said trunk circuit through an exchange.

13. A device according to claim 1, wherein a terminal apparatus for transmitting/receiving a packet is connected to the transmission line through a telephone exchange including a trunk circuit, and said buffer means and said buffer control means are arranged in said trunk circuit.

14. A delay fluctuation absorbing method comprising the steps of:

storing a packet sent through a transmission line in buffer means;

reading the packet from said buffer means a predetermined read delay time after the packet is stored in said buffer means; and updating the read delay time of said buffer means at unit time intervals on the basis of a transmission delay time of the packet, wherein the step of updating comprises the step of shortening the read delay time step by step.

15. A method according to claim 14, wherein the step of changing comprises the step of shortening the read delay time when the transmission delay time obtained at unit time intervals is kept shorter than the read delay time for a first time longer than the unit time.

16. A method according to claim 14, wherein the step of changing comprises the step of shortening the read delay time when the transmission delay time obtained at unit time intervals is kept shorter than the read delay time for a first time longer than the unit time and a packet reception ratio in a second time shorter than the read delay time falls within an allowable range.

17. A method according to claim 14, wherein the step of changing comprises the step of shortening the read delay time step by step at equal time intervals.

18. A method according to claim 14, further comprising the step of calculating a read delay time on the basis of a transmission delay time obtained from reception intervals of packets received within the unit time.

19. A method according to claim 14, further comprising the step of quickly prolonging the read delay time when the read delay time is to be prolonged.

20. A method according to claim 14, wherein the step of updating comprises the steps of:

calculating a transmission delay time of each packet from reception intervals of the packets at unit time intervals;

calculating a buffer amount of said buffer means which is required to absorb transmission delay fluctuations in packets within the unit time on the basis of the calculated transmission delay time;

comparing the calculated buffer amount with a current buffer amount of said buffer means;

shortening the read delay time step by step to an optimal value corresponding to the calculated buffer amount at unit time intervals when the calculated buffer amount is kept smaller than the current buffer amount for a first time longer than the unit time; and quickly prolonging the read delay time to an optimal value corresponding to the calculated buffer amount when the calculated buffer amount is larger than the current buffer amount.

* * * * *